United States Patent
Li

(10) Patent No.: US 10,354,091 B2
(45) Date of Patent: Jul. 16, 2019

(54) DATA PROCESSING SYSTEM CAPABLE OF SECURING FILES

(71) Applicant: TRUSTVIEW INC., Taipei (TW)

(72) Inventor: Chien-I Li, Taipei (TW)

(73) Assignee: TRUSTVIEW INC., Taipei (TW)

( * ) Notice: Subject to any disclaimer, the term of this patent is extended or adjusted under 35 U.S.C. 154(b) by 172 days.

(21) Appl. No.: 15/603,060

(22) Filed: May 23, 2017

(65) Prior Publication Data

US 2018/0018475 A1 Jan. 18, 2018

(30) Foreign Application Priority Data

Jul. 12, 2016 (TW) .............................. 105121904 A

(51) Int. Cl.
*G06F 21/00* (2013.01)
*G06F 21/62* (2013.01)

(52) U.S. Cl.
CPC .. *G06F 21/6281* (2013.01); *G06F 2221/2105* (2013.01)

(58) Field of Classification Search
CPC ......... G06F 21/6281; G06F 2221/2105; G06F 3/0604; G06F 3/0644; G06F 3/0653; G06F 21/6218; H04W 12/08
USPC .......................................................... 726/17
See application file for complete search history.

(56) References Cited

U.S. PATENT DOCUMENTS

| | | | |
|---|---|---|---|
| 9,129,138 B1* | 9/2015 | Hesselink | G06F 21/78 |
| 2003/0208686 A1* | 11/2003 | Thummalapally | |
| | | | G06F 21/6218 |
| | | | 713/193 |
| 2009/0094676 A1* | 4/2009 | Burugula | G06F 21/554 |
| | | | 726/2 |
| 2013/0246557 A1* | 9/2013 | Das | H04L 67/327 |
| | | | 709/217 |
| 2014/0310824 A1* | 10/2014 | Ma | G06F 21/6209 |
| | | | 726/30 |

* cited by examiner

*Primary Examiner* — Yogesh Paliwal
(74) *Attorney, Agent, or Firm* — Muncy, Geissler, Olds & Lowe, P.C.

(57) ABSTRACT

The invention provides a data processing system capable of securing files. The data processing system of the invention divides a data storage device into an unprotected space and a protected space. A protected application resided in an operating system is controlled by an application controlling module residing in the operating system. When the application controlling module receives a file access request information transmitted from the protected application, the application controlling module redirects the file access request information to access a plurality of protected files stored in the protected space in accordance with the file access request information, and then to return the access result of the protected files to the protected application.

5 Claims, 1 Drawing Sheet

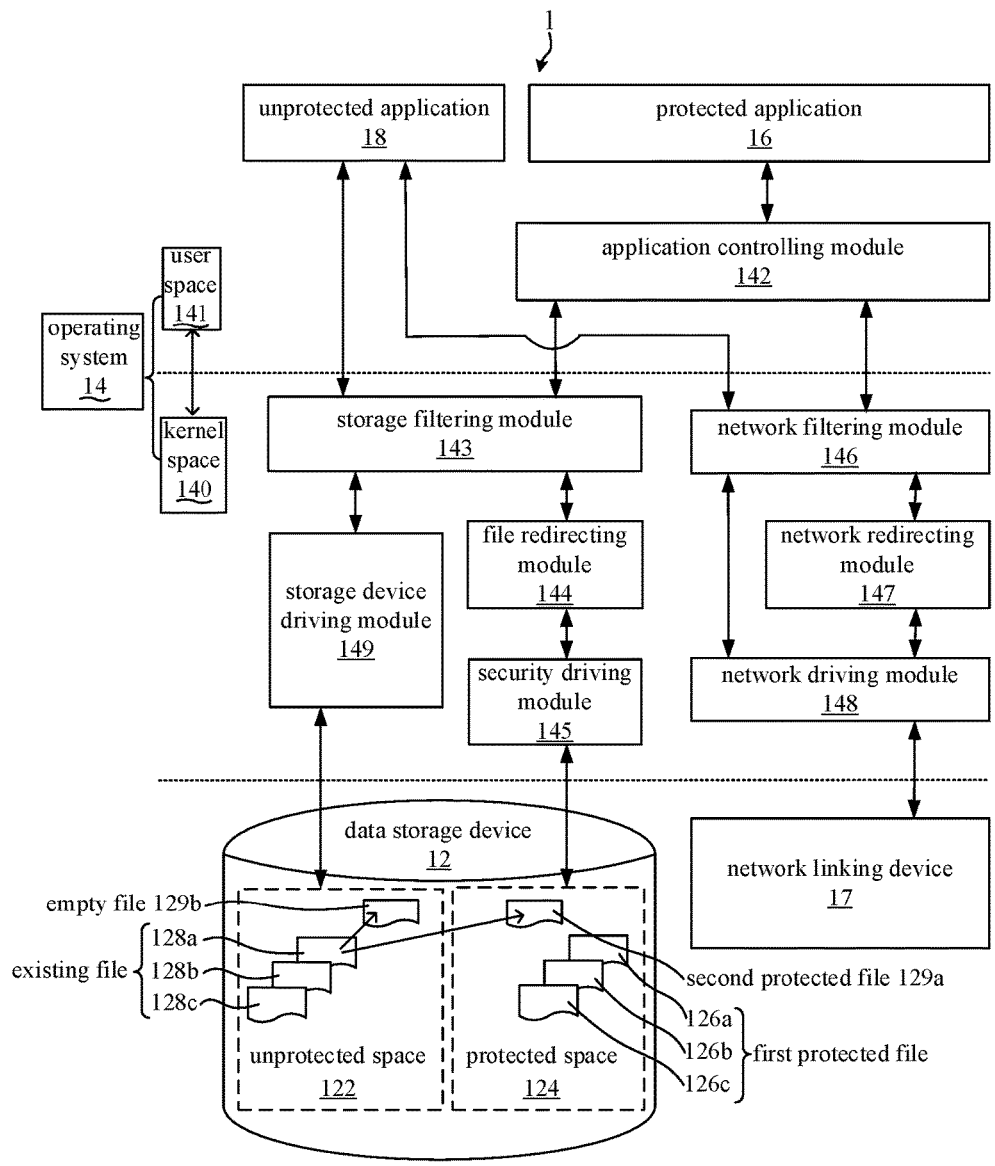

ated and controlled by the application controlling module. When the application controlling module receives a first file access request information transmitted from the protected application, the application controlling module transmits the first file access request information and an identification information relative to the protected application to the storage filtering module. The storage filtering module transmits the first file access request information to the file redirecting module in accordance with the identification information. The file redirecting module forwards the first file access request information to the security driving module. The security driving module accesses the plurality of first protected files stored in the protected space of the data storage device in accordance with the first file access request information, and then returns a first access result of the first protected files to the protected application.

DATA PROCESSING SYSTEM CAPABLE OF SECURING FILES

CROSS-REFERENCE TO RELATED APPLICATION

This utility application claims priority to Taiwan Application Serial Number 105121904, filed Jul. 12, 2016, which is incorporated herein by reference.

BACKGROUND OF THE INVENTION

1. Field of the Invention

The invention relates to a data processing system, and in particular, to a data processing system capable of comprehensively securing files and applications without the need of complex encryption, decryption and certification procedures.

2. Description of the Prior Art

Current protection of files mostly relies on complex encryption, decryption and certification procedures. Encryption technology sometimes causes file failure, and needs to integrate with the interface of the application. Therefore, the introduction of encryption technology takes much cost and time.

The aforementioned way of file protection has complex architecture and higher cost, and it is easy to be implemented in personal data processing systems, such as notebook computers, desktop computers, tablet PCs, smart phones, and so on. In addition, the file encryption cannot protect from increasingly rampant ransomware attack.

In addition, the security of the data processing system should also include the protection of the applications and the restrictions on transmission channels.

SUMMARY OF THE INVENTION

Accordingly, one scope of the invention is to provide a data processing system capable of securing files. In particular, the data processing system according to the invention can comprehensively securing files and applications without the need of complex encryption, decryption and certification procedures. Moreover, the security of the data processing system according to the invention also include the restrictions on transmission channels.

A data processing system according to a preferred embodiment of the invention includes a data storage device and at least one processor. The data storage device is divided into an unprotected space and a protected space. A plurality of first protected files are stored in the protected space of the data storage device. The at least one processor is coupled to the data storage device, and functions in executing an operating system. The operating system has a kernel space and a user space, and includes an application controlling module, a storage filtering module, a file redirecting module and a security driving module. The application controlling module resides in the user space. The storage filtering module resides in the kernel space, and is coupled to the application controlling module. The file redirecting module resides in the kernel space, and is coupled to the storage filtering module. The security driving module resides in the kernel space, and is respectively coupled to the file redirecting module and the protected space of the data storage device. A protected application residing in the user space is In one embodiment, the protected space can be implemented into an image file.

Further, the data processing system according to the preferred embodiment of the invention also includes a network linking device connected to the at least one processor. The operating system also includes a network filtering module, a network redirecting module and a network driving module. The network filtering module resides in the kernel space, and is coupled to the application controlling module. The network redirecting module resides in the kernel space, and is coupled to the network filtering module. The network driving module resides in the kernel space, and is respectively coupled to the network redirecting module and the network linking device. When the application controlling module receives a first network access request information transmitted from the protected application, the application controlling module transmits the first network access request information and the identification information to the network filtering module. The network filtering module transmits the first network access request information to the network redirecting module in accordance with the identification information. The network redirecting module selectively links the protected application to a safe channel or prohibits a first transmission relative to the first network access request information in accordance with a first destination information of the first network access request information.

Further, if the application controlling module judges that the first file access request information relates to transferring of at least one first protected file of the plurality of first protected files to the unprotected space of the data storage device, the application controlling module prohibits execution of the first file access request information.

Further, if the application controlling module judges that the first file access request information relates to printing of at least one first protected file of the plurality of first protected files, the application controlling module prohibits execution of the first file access request information.

Further, a plurality of existing files are stored in the unprotected space of the data storage device. The at least one processor executes a security scanning program to judge if one existing file of the plurality of existing files meets a security rule, and if YES, to duplicate said one existing file stored in the protected space of the data storage device into a second protected file, to clear the content of said one existing file such that said one existing file changes into an empty file, to create a linking information linking the second protected file and the empty file, and to store the linking information in the storage filtering module.

In one embodiment, when the application controlling module receives a second file access request information, directing to the empty file, transmitted from the protected application, the application controlling module transmits the second file access request information and the identification information to the storage filtering module. The storage filtering module alters the second file access request information into a third file access request information directing to the second protected file in accordance with the identification information and the linking information and transmits the third file access request information to the file redirecting module. The file redirecting module forwards the third file access request information to the security driving module. The security driving module accesses the second protected file stored in the protected space of the data storage device in accordance with the third file access request information, and then returns a second access result of the second protected file to the protected application.

In one embodiment, an unprotected application resides in the user space. The operating system also includes a storage device driving module residing in the kernel space and being respectively coupled to the storage filtering module and the unprotected space of the data storage device. When the storage filtering module receives a fourth file access request information, directing to the empty file, transmitted from the unprotected application, the storage filtering module transmits the fourth file access request information to the storage device driving module. The storage device driving module accesses the empty file stored in the unprotected space of the data storage device in accordance with the fourth file access request information and then returns a third access result of the empty file to the unprotected application.

In one embodiment, when the storage filtering module receives a fifth file access request information directing to the plurality of existing files transmitted from the unprotected application, the storage filtering module transmits the fifth file access request information to the storage device driving module. The storage device driving module accesses the plurality of existing files stored in the unprotected space of the data storage device in accordance with the fifth file access request information, and then returns a fourth access result of the plurality of existing files to the unprotected application.

Further, the network filtering module is also coupled to the unprotected application. When the network filtering module receives a second network access request information transmitted from the unprotected application, the network filtering module selectively links the unprotected application to a general website or prohibits a second transmission relative to the second network access request information in accordance with a second destination information of the second network access request information.

Compared to the prior art, the data processing system according to the invention is easy to be implemented in personal data processing systems, and can comprehensively securing files and applications without the need of complex encryption, decryption and certification procedures. Moreover, the security of the data processing system according to the invention also include the restrictions on transmission channels.

The advantage and spirit of the invention may be understood by the following recitations together with the appended drawings.

BRIEF DESCRIPTION OF THE APPENDED DRAWINGS

The FIGURE is a schematic diagram showing the architecture of a data processing system according to a preferred embodiment of the invention.

DETAILED DESCRIPTION OF THE INVENTION

Referring to the FIGURE, the architecture of a data processing system 1 according to a preferred embodiment of the invention is illustratively shown in the FIGURE. In one embodiment, the data processing system 1 according to the invention can be various personal data processing system, such as a notebook computer, a desktop computer, a tablet PC, a smart phones, and so on. The data processing system 1 according to the invention can also be a server.

As shown in the FIGURE, the data processing system 1 according to a preferred embodiment of the invention includes a data storage device 12 and at least one processor (not shown in the FIGURE).

In particular, the data storage device 12 is divided into an unprotected space 122 and a protected space 124. A plurality of first protected files (126a~126c) are stored in the protected space 124 of the data storage device 12.

The at least one processor is coupled to the data storage device 12, and functions in executing an operating system 14. The operating system 14 has a kernel space 140 and a user space 141, and includes an application controlling module 142, a storage filtering module 143, a file redirecting module 144 and a security driving module 145.

The application controlling module 142 resides in the user space 141 of the operating system 14. The storage filtering module 143 resides in the kernel space 140 of the operating system 14, and is coupled to the application controlling module 142. The file redirecting module 144 resides in the kernel space 140 of the operating system 14, and is coupled to the storage filtering module 143. The security driving module 145 resides in the kernel space 140 of the operating system 14, and is respectively coupled to the file redirecting module 144 and the protected space 124 of the data storage device 12.

A protected application 16 residing in the user space 141 is activated and controlled by the application controlling module 142. When the application controlling module 142 receives a first file access request information transmitted from the protected application 16, the application controlling module 142 transmits the first file access request information and an identification information relative to the protected application 16 to the storage filtering module 143. The storage filtering module 143 transmits the first file access request information to the file redirecting module 144 in accordance with the identification information. The file redirecting module 144 forwards the first file access request information to the security driving module 145. The security driving module 145 accesses the plurality of first protected files (126a~126c) stored in the protected space 124 of the data storage device 12 in accordance with the first file access request information, and then returns a first access result of the first protected files (126a~126c) to the protected application 16.

In one embodiment, the protected space 124 can be implemented into an image file. For example, the protected space 124 can be, but not limited to, a file in ISO format, DMG format or other equivalent format.

Further, also as shown in the FIGURE, the data processing system 1 according to the preferred embodiment of the invention also includes a network linking device 17 connected to the at least one processor. The operating system 14 also includes a network filtering module 146, a network redirecting module 147 and a network driving module 148. The network filtering module 146 resides in the kernel space 140 of the operating system 14, and is coupled to the application controlling module 142. The network redirecting module 147 resides in the kernel space 140 of the operating system 14, and is coupled to the network filtering module 146. The network driving module 148 resides in the kernel space 140 of the operating system 14, and is respectively coupled to the network redirecting module 147 and the network linking device 17.

When the application controlling module 142 receives a first network access request information transmitted from the protected application 16, the application controlling module 142 transmits the first network access request information and the identification information to the network filtering module 146. The network filtering module 146 transmits the first network access request information to the network redirecting module 147 in accordance with the identification information. The network redirecting module 147 selectively links the protected application 16 to a safe channel or prohibits a first transmission relative to the first network access request information in accordance with a first destination information of the first network access request information.

Further, if the application controlling module 142 judges that the first file access request information relates to transferring of at least one first protected file (126a~126c) of the plurality of first protected files (126a~126c) to the unprotected space 122 of the data storage device 12, the application controlling module 142 prohibits execution of the first file access request information.

Further, if the application controlling module 142 judges that the first file access request information relates to printing of at least one first protected file (126a~126c) of the plurality of first protected files (126a~126c), the application controlling module 142 prohibits execution of the first file access request information.

As shown in the FIGURE, a plurality of existing files (128a~128c) are previously stored in the unprotected space 122 of the data storage device 12. The plurality of existing files (128a~128c) therein have an important file needed to be transferred to the protected space 124 of the data storage device 12. As in the general case, the plurality of existing files (128a~128c) in fact are so many that users cannot view and then transfer the files one by one. Therefore, the plurality of existing files (128a~128c) need to be scanned totally. However, if the procedure is only to transfer the file to the protected space 124, there is a problem with some associated files that cannot be found in the original location. The data processing system 1 according to the invention also provides a solution to this problem, which will be described in detail hereinafter.

Further, the at least one processor executes a security scanning program (not shown in the FIGURE) to judge if one existing file (128a~128c) of the plurality of existing files (128a~128c) meets a security rule, and if YES, to duplicate said one existing file (128a~128c) stored in the protected space 124 of the data storage device 12 into a second protected file 129a, to clear the content of said one existing file (128a~128c) such that said one existing file (128a~128c) changes into an empty file 129b, to create a linking information linking the second protected file 129a and the empty file 129b, and to store the linking information in the storage filtering module 143. In the FIGURE, only to illustrate simply, it is assumed that only the existing file 128a in the existing files (128a-128c) meets the security rule, and therefore, the existing file 128a is duplicated into the second protected file 129a and the second protected file 129a is stored in the protected space 124 of the data storage device 12. Moreover, the empty file 129a is still stored in the unprotected space 124 of the data storage device 12.

In one embodiment, the security rule can be set by users, e.g., specific file formats, specific editors, and so on.

In one embodiment, when the application controlling module 142 receives a second file access request information, directing to the empty file 129b, transmitted from the protected application 16, the application controlling module 142 transmits the second file access request information and the identification information to the storage filtering module 143. The storage filtering module 143 alters the second file access request information into a third file access request information directing to the second protected file 129a in accordance with the identification information and the linking information and transmits the third file access request information to the file redirecting module 144. The file redirecting module 144 forwards the third file access request information to the security driving module 145. The security driving module 145 accesses the second protected file 129a stored in the protected space 124 of the data storage device 12 in accordance with the third file access request information, and then returns a second access result of the second protected file 129a to the protected application 16.

In one embodiment, an unprotected application 18 resides in the user space 141 of the operating system 14. The operating system 14 also includes a storage device driving module 149 residing in the kernel space 140 of the operating system 14 and being respectively coupled to the storage filtering module 143 and the unprotected space 122 of the data storage device 12. When the storage filtering module 143 receives a fourth file access request information, directing to the empty file 129b, transmitted from the unprotected application 18, the storage filtering module 143 transmits the fourth file access request information to the storage device driving module 149. The storage device driving module 149 accesses the empty file 129b stored in the unprotected space 122 of the data storage device 12 in accordance with the fourth file access request information and then returns a third access result of the empty file 129b to the unprotected application 18.

In one embodiment, when the storage filtering module 143 receives a fifth file access request information directing to the plurality of existing files (128a~128c) transmitted from the unprotected application 18, the storage filtering module 143 transmits the fifth file access request information to the storage device driving module 149. The storage device driving module 149 accesses the plurality of existing files (128a~128c) stored in the unprotected space 122 of the data storage device 12 in accordance with the fifth file access request information, and then returns a fourth access result of the plurality of existing files (128a~128c) to the unprotected application 18. That is to say that, according to the architecture of the data processing system 1 of the invention, the unprotected application 18 can only access the files stored in the unprotected space 122 of the data storage device 12 and cannot access the files stored in the protected space 124 of the data storage device 12.

Further, the network filtering module 146 is also coupled to the unprotected application 18. When the network filtering module 146 receives a second network access request information transmitted from the unprotected application 18, the network filtering module 146 selectively links the unprotected application 18 to a general website or prohibits a second transmission relative to the second network access request information in accordance with a second destination information of the second network access request information. Thereby, the unprotected application 18 can only link to a general network and cannot link to a restricted transmission channel.

The data processing system according to the invention can protect important documents, design drawings, web pages, program codes and son on. The data processing system according to the invention can be implemented in an enterprise and controlled inside an intranet of the enterprise. Because the data processing system according to the invention protects the files without use of encryption technology, the data processing system according to the invention can avoid the problem of files failure induced by the encryption technology. Moreover, the data processing system according to the invention can reduce cost and time needed by introduction due to without the need of integration with the interface of the application.

Since the data processing system according to the invention protects the protected space and the unprotected space of the storage device, malicious attacks such as ransomwares cannot attack the important files stored in the protected space. For protected space created at user terminal, ransomwares cannot read, write and destroy the important files stored in the protected space. For server terminal, a virtually physical isolation technology at network layer is used so that ransomwares outside the security isolation space cannot use a network port to connect to the server site protected by the virtual isolation.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing system, comprising:
a data storage device, being divided into an unprotected space and a protected space, wherein a plurality of first protected files are stored in the protected space;
a network linking device; and
at least one processor, being respectively coupled to the data storage device and the network linking device and functioning in executing an operating system, the operating system having a kernel space and a user space and including;
an application controlling module, residing in the user space;
a storage filtering module, residing in the kernel space and being coupled to the application controlling module;
a file redirecting module, residing in the kernel space and being coupled to the storage filtering module;
a security driving module, residing in the kernel space and being respectively coupled to the file redirecting module and the protected space;
a network filtering module, residing in the kernel space and being coupled to the application controlling module;
a network redirecting module, residing in the kernel space and being coupled to the network filtering module; and
a network driving module, residing in the kernel space and being respectively coupled to the network redirecting module and the network linking device;
wherein a protected application residing in the user space is activated and controlled by the application controlling module, when the application controlling module receives a first file access request information transmitted from the protected application, the application controlling module transmits the first file access request information and an identification information relative to the protected application to the storage filtering module, the storage filtering module transmits the first file access request information to the file redirecting module in accordance with the identification information, the file redirecting module forwards the first file access request information to the security driving module, the security driving module accesses the plurality of first protected files stored in the protected space in accordance with the first file access request information, and then returns a first access result of the first protected files to the protected application;
wherein when the application controlling module receives a first network access request information transmitted from the protected application, the application controlling module transmits the first network access request information and the identification information to the network filtering module, the network filtering module transmits the first network access request information to the network redirecting module in accordance with the identification information, the network redirecting module selectively links the protected application to a safe channel or prohibits a first transmission relative to the first network access request information in accordance with a first destination information of the first network access request information; and
wherein a plurality of existing files are stored in the unprotected space, the at least one processor executes a security scanning program to judge if one existing file of the plurality of existing files meets a security rule, and if YES, to duplicate said one existing file stored in the protected space into a second protected file, to clear the content of said one existing file such that said one existing file changes into an empty file, to create a linking information linking the second protected file and the empty file, and to store the linking information in the storage filtering module.

2. The data processing system of claim 1, wherein when the application controlling module receives a second file access request information directing to the empty file transmitted from the protected application, the application controlling module transmits the second file access request information and the identification information to the storage filtering module, the storage filtering module alters the second file access request information into a third file access request information directing to the second protected file in accordance with the identification information and the linking information and transmits the third file access request information to the file redirecting module, the file redirecting module forwards the third file access request information to the security driving module, the security driving module accesses the second protected file stored in the protected space in accordance with the third file access request information and then returns a second access result of the second protected file to the protected application.

3. The data processing system of claim 1, wherein an unprotected application resides in the user space, the operating system also comprises a storage device driving module residing in the kernel space and being respectively coupled to the storage filtering module and the unprotected space, when the storage filtering module receives a fourth file access request information directing to the empty file transmitted from the unprotected application, the storage filtering module transmits the fourth file access request information to the storage device driving module, the storage device driving module accesses the empty file stored in the unprotected space in accordance with the fourth file access request information and then returns a third access result of the empty file to the unprotected application.

4. The data processing system of claim 3, wherein when the storage filtering module receives a fifth file access request information directing to the plurality of existing files transmitted from the unprotected application, the storage filtering module transmits the fifth file access request information to the storage device driving module, the storage device driving module accesses the plurality of existing files stored in the unprotected space in accordance with the fifth file access request information and then returns a fourth access result of the plurality of existing files to the unprotected application.

5. The data processing system of claim 3, wherein the network filtering module is also coupled to the unprotected application, when the network filtering module receives a second network access request information transmitted from the unprotected application, the network filtering module selectively links the unprotected application to a general website or prohibits a second transmission relative to the second network access request information in accordance with a second destination information of the second network access request information.

* * * * *